Dec. 10, 1935. H. Z. COBB 2,023,407
STOP MECHANISM
Filed June 16, 1934 2 Sheets-Sheet 2

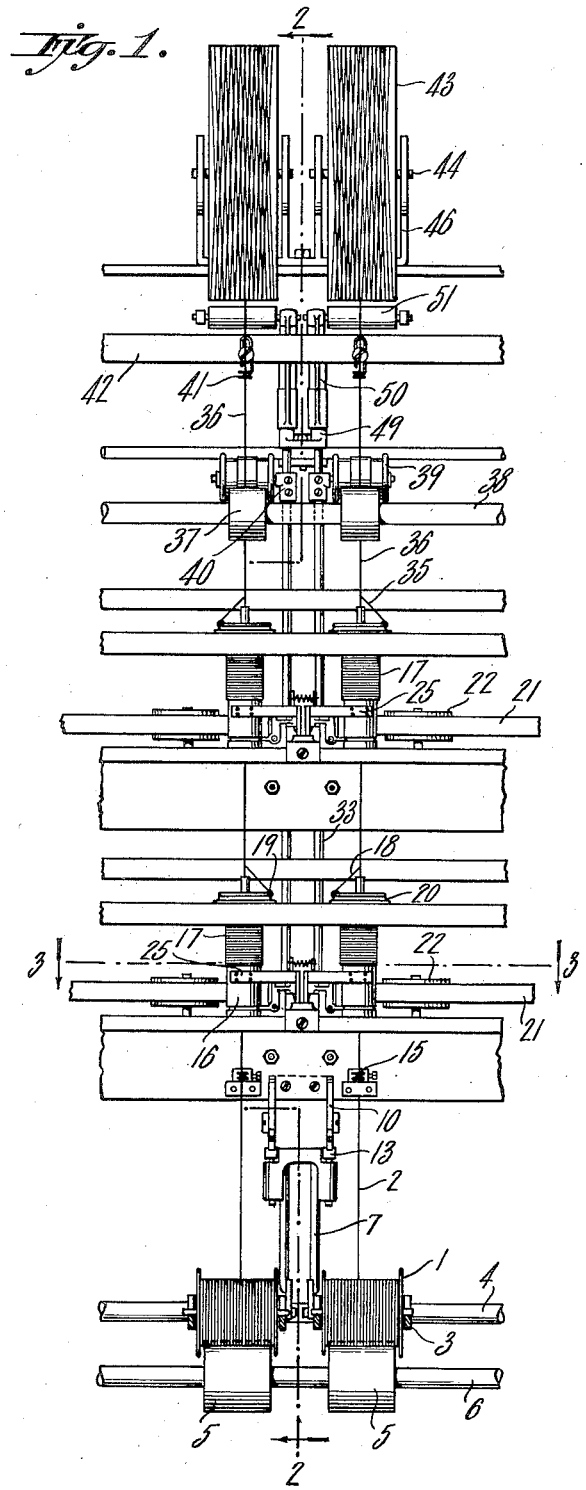

INVENTOR
HENRY Z. COBB
BY
Walter L. Piper
ATTORNEY

Patented Dec. 10, 1935

2,023,407

UNITED STATES PATENT OFFICE 2,023,407

STOP MECHANISM

Henry Z. Cobb, Providence, R. I., assignor, by mesne assignments, to United States Rubber Company, New York, N. Y., a corporation of New Jersey Application June 16, 1934, Serial No. 730,865

8 Claims. (Cl. 117—45)

This invention relates to a stop mechanism, more particularly a stop mechanism for spinning, twisting and covering machines.

In covering machines such as those used for covering rubber or other elastic cores with fibrous material, in a common type the core is fed up through a hollow rotating spindle which is frictionally driven by a belt, the spindle carrying a spool of thread, yarn or other filamentary material which is led off the spool and by means of a ring traveler is wound on the core. In this type of covering machines an entire series of spindles is usually associated in horizontal alignment and all of the spindles are frictionally driven by a single belt. In such machines, when it is desired to stop an individual spindle for repair, adjustment or replacement purposes, it is necessary to either stop the belt driving the entire series of spindles or else the operator, by means of a hand tool, pries the belt away from the selected spindle while making the necessary adjustment, replacement or repair.

Both of these methods of stopping the spindle are open to serious objections. In the case where all of the spindles are stopped, necessarily the production on all of them must stop until the selected spindle is again put in operation. If a single spindle is stopped by forcing the belt away from the spindle, or two vertically aligned spindles in the case of a double covering machine, the associated core feeding and finished thread winding mechanisms if left untouched necessarily must continue to operate, although at this time the core is not being covered and this, of course, would necessitate cutting out the uncovered portions of the core and knotting or otherwise joining the ends of the covered thread. In such machines, after stopping the spindles, the practice is to move the spool holder for the core away from its drive roll, lift off the movable nip roll, and finally lift off and move to one side the wind-up drum, and all these operations must be reversed when the machine is again started.

An object of the present invention is to provide an individual spindle stop and brake for series belt-driven spinning, twisting or covering machines.

Another object is to provide an individual spindle stop and brake in which any feeding and wind-up mechanisms associated with the spindle are stopped simultaneously with the spindle.

Another object is to provide an electrically operated individual spindle stop and brake for series belt-driven spinning, twisting or covering machines.

Other objects will appear from the detailed description and drawings, in which latter:

Figure 1 is a broken away front elevation of a covering machine with parts omitted;

Figure 2 is a section on the line 2—2 of Fig. 1;

Figure 3:
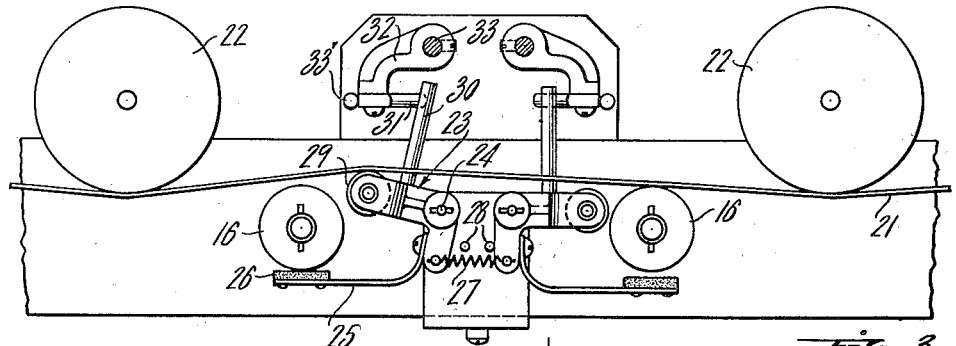
Fig. 3 is a horizontal section on the line 3—3 of Fig. 1.
Figure 4:
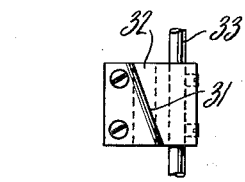
Fig. 4 is a detail of a cam lifting mechanism.

While the invention in some or all aspects is capable of general application to spinning, twisting and covering machines, in the present specification an embodiment suitable for a covering machine such as one for applying a double covering to a rubber or other elastic core will be described. In the form of machine herein shown, the spindles for effecting the first covering are arranged in adjoining pairs in a horizontally aligned series of the spindles, and a similar series of spindles is arranged above and in vertical alignment with the first series for effecting the second covering. This entire assembly is duplicated on the opposite side of the machine, and each horizontal series of spindles is driven by a single belt. As the covering devices for each core are identical but one of them will be described.

Referring to Fig. 1, the numeral 1 denotes a spool for carrying an elastic core thread 2, the spool being removably mounted in a yoke 3 pivotally carried on a shaft 4, and the spool 1 is adapted to rest by gravity on and be frictionally driven by a feed roll 5 mounted on the shaft 6. In order to shift the spool 1 from its feed roll, a link 7 is pivotally connected to one arm of the yoke 3 and at its upper end is provided with a stop collar 8. Slidably mounted on the rod 7 is a swivel 9 to which is pivotally connected an operating lever 10 pivotally mounted on the frame of the machine at 11. The lever 10 carries a dog 12 which is adapted to engage on one side or the other of the wedge head 13 of the spring pressed detent 14. It will be seen that the dog 12 and head 13 will yieldingly hold the lever 10 in either raised or lowered position.

The elastic thread 2, after being unreeled from the spool 1, passes through a thread guide 15 and then upwardly through a hollow spindle 16 carrying a spool 17 of thread, yarn or other filamentary covering material. The filamentary material 18 as it is unwound from the spool 17 passes through a traveler 19 moving on the traveler ring 20 and thence is wound on the core 2. Referring to Fig. 3, the spindle 16 is frictionally driven by a belt 21, which belt, as before stated, is adapted to drive an entire horizontally disposed series of pairs of spindles, and adjacent each spindle an idler roll 22 is disposed to press the belt against the spindle. The stop mechanism for each spindle comprises a bell crank lever 23 mounted on the frame of the machine on a pivot 24, and one arm of the bell crank lever carries a spring arm 25 upon which is mounted a brake 26 adapted to be brought into frictional contact with the spindle 16. The brake is normally held away from the spindle 16 by a coil spring 27 or other suitable spring attached at one end to the same arm of the bell crank lever, and in the present instance attached at the other end to the bell crank lever of an adjoining spindle. Undue movement of the brake away from the spindle is limited by the stop pin 28, with which the arm of the bell crank lever is adapted to contact. The other arm of the bell crank lever carries at its free end a roller 29 which is adapted to engage the belt 21, and upon rocking of the lever to shift the belt away from frictional contact with the adjacent spindle 16. In order to rock the bell crank lever, a rock arm 30 is attached thereto which is adapted to be engaged and moved by the cam or wedge 31 mounted on an arm 32 rigidly connected to a lift rod 33. Any twisting movement of the arm and wedge is prevented by the stop pin 33'. The lift rod 33 extends vertically through guideways carried by the frame of the machine, and at its lower end is pivotally connected at 34 to the hand lever 10. It will be seen that upon downward movement of the hand lever 10, the lift rod 33 is elevated and in such movement the cam 31 engages the rocker arm 30 to rock the bell crank lever 23 on its pivot and thus simultaneously shift the belt 21 from the spindle 16 and apply the brake 26 to the spindle.

In the present instance a machine has been illustrated in which two covers are applied to the core, and in this case the core 2 after being covered with the thread or other filamentary material 18 passes upwardly through a second covering mechanism comprising a spindle and associated parts which are in all respects similar to those just described. The second or upper covering mechanism is also provided with a belt shifter and brake which are similar in all respects to those just described. However, in order to balance the covered thread, the filamentary covering material 35 of the second or upper spindle is wound upon the core in a direction opposite to the covering filament 18.

The covered elastic thread 36 then passes between a driven nip roll 37 mounted on drive shaft 38 and a movable idler nip roll 39, the bearing 40 of which is rigidly mounted on the lift rod 33. It will be seen that with the above described construction when the lift rod is elevated to stop the spindle 16, it at the same time will separate nip rolls 37 and 39 and thereby halt their feeding and tensioning action.

From the nip rolls the covered thread passes through a thread guide 41 mounted on a traverse bar 42 and is then fed to the wind-up drum 43. The wind-up drum is so mounted as to be movable, as by mounting its axle 44 in the guide slots 45 in bracket 46 carried by the frame of the machine. The wind-up drum 43, due to its loose mounting, rests by gravity on and is frictionally driven by the feed roll 47 mounted on drive shaft 48. The upper part of the lift rod 33 passes through a guide bracket 49 mounted on the frame of the machine, and at its upper end the lift rod carries a bracket or arm 50 on the upper end of which is mounted a roller 51 which is adapted, upon elevation of the lift rod 33, to engage the wind-up drum 43 and shift it from driving contact with its feed roll 47.

Figure 6:
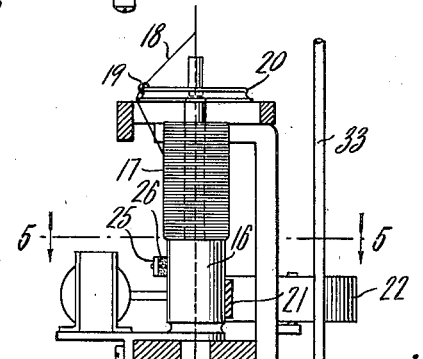
Fig. 6 is a vertical sectional detail of said modification.
Figure 5:
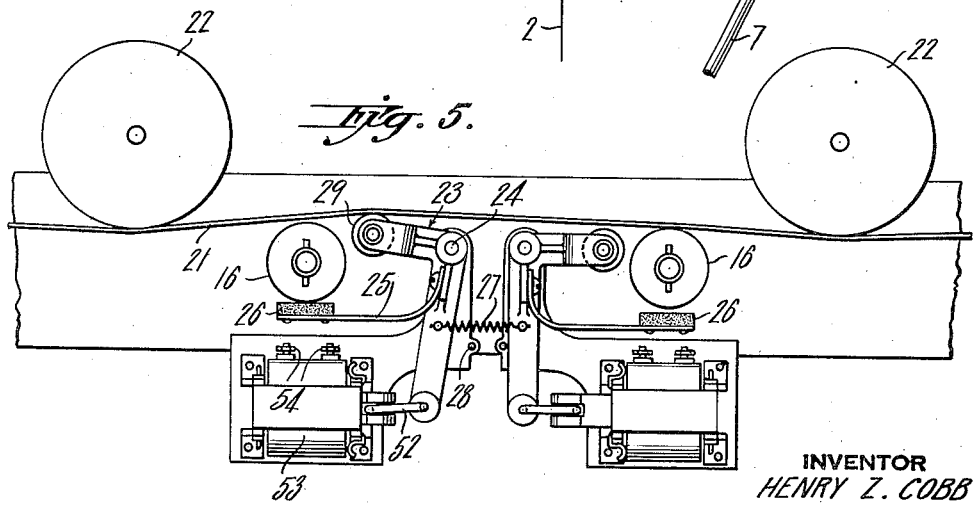
Fig. 5 is a horizontal section similar to Fig. 3, and taken on the line 5—5 of Fig. 6, of a slightly modified and electrically operated form of belt shifter and spindle brake.

In Figs. 5 and 6 there is shown a slight modification of the spindle belt shifter and brake, in which the shifter and brake are electrically operated. In this form of the invention, the bell crank lever 23 is pivotally mounted at 24 in the same manner as in the form previously described, but one arm of the lever is connected by a link 52 to the plunger of a solenoid 53, so that upon passage of a current through the solenoid the plunger will act to rock the lever 23 on its pivot. Such rocking movement is resisted by the spring 27 connected at one end to the same arm of the bell crank lever and in the present instance connected at its opposite end to the bell crank lever of an adjoining spindle. Pins 28 are provided to prevent too great a retracting movement of the bell crank lever by the spring 27. The same arm of the bell crank lever carries a spring arm 25 and a brake 26 for engagement with the spindle 16, which parts are identical with those previously described. The other arm of the bell crank lever also carries a roller 29 which is adapted to shift the belt 21 in the same manner as previously described. The terminals 54 of the solenoid are connected to wires 55 (Fig. 6) which wires lead to a common type of mercury switch 56 mounted on the lever 10. It will be seen that in the position of the lever 10 shown in Fig. 6, the switch will be tilted and the mercury will be at the right hand side of the switch and the circuit to the solenoid will therefore be open, but when the lever 10 is depressed, the mercury will flow to the left hand side of the switch and close the circuit through the solenoid 53, thereby causing the bell crank lever 23 to be rocked upon its pivot and shift the belt 21 and apply the brake 26.

In operation, if at any time it is desired to stop an individual covering device for any purpose, all that is necessary is to depress the hand lever 10 and such action causes the yoke 3 to be raised and thereby shift the spool 1 containing the rubber core 2 from its drive roll 5. At the same time the lift rod 33 is elevated and in such elevation the cams or wedges 31 mounted on the lift rod will engage the rock arms 30 to rock the bell crank levers 23 and thereby shift the belts 21 from their respective upper and lower spindles 16 and at the same time apply the brakes 26 to the spindles. Also, such movement of the lift rod 33 will raise the nip roll 39 out of contact with the nip roll 37 and thereby halt all feeding and tensioning action on the thread, while at the same time the roller 51 will be elevated to lift the wind-up drum 43 from its drive roll 47 and thereby stop all wind-up action. The operation is the same with the modification shown in Figs. 5 and 6 with the single exception that the belt shifters and brake mechanisms for the spindles are electrically operated by the solenoids 53.

It will be seen that the simultaneous stoppage of all the associated parts, such as core feed, nip rolls and wind-up drums, when a spindle is stopped, is particularly desirable, since it leaves all parts in status quo until the stopped spindles are started again.

While, as before stated, the invention has been described in detail as applied to a covering machine for covering an elastic core with a double cover of filamentary material, it is obvious that the invention is applicable in the case where only a single covering is applied and also where the core is of other material than rubber, and it is also applicable to spinning and twisting machines generally where it is desired to quickly halt a single spindle in a series of spindles frictionally driven by the same belt drive.

While a specific embodiment of the invention has been shown and described, it is obvious that modifications may be made therein and it is not desired to limit the invention otherwise than as set forth in the appended claims.

Having thus described my invention, what I claim and desire to protect by Letters Patent is:

1. A stop mechanism comprising a spool-carrying spindle, traveler and filament feeding and wind-up mechanisms associated therewith, a drive belt adapted to frictionally contact said spindle, means for rotatably supporting the spindle in a fixed position along the belt and means for simultaneously effecting the movement of the belt out of driving engagement with the spindle, applying the brake to the spindle, and stopping said filament feeding and wind-up mechanisms.

2. A stop mechanism comprising a series of spool-carrying spindles, traveler and filament feeding and wind-up mechanisms associated with each spindle, a drive belt adapted to frictionally contact all of said spindles, means for rotatably supporting each spindle in a fixed position along the belt and means for simultaneously effecting the movement of the belt out of driving engagement with a selected spindle, applying a brake to the spindle, and stopping said filament feeding and wind-up mechanisms.

3. A stop mechanism comprising a hollow spool-carrying spindle, a drive belt adapted to frictionally contact said spindle, means for feeding a core through said spindle, a traveler mechanism associated with said spindle for wrapping a fibrous covering from the spool around a core fed through the spindle, and means for simultaneously separating said belt and spindle, applying a brake to the spindle, and stopping said core feeding means.

4. A stop mechanism comprising a hollow spool-carrying spindle, a drive belt adapted to frictionally contact said spindle, means for feeding a core through said spindle including a support for a core spool and a drive roll for said core spool disposed below said spindle and a pair of separable nip rolls disposed above the spindle, traveler mechanism for winding fibrous covering material from the spindle spool on said core, and means for simultaneously separating said belt and spindle, applying a brake to the spindle, separating the core spool and its drive roll, and separating the nip rolls.

5. A stop mechanism comprising a hollow spool-carrying spindle, a drive belt adapted to frictionally contact said spindle, means for feeding a core through said spindle, traveler mechanism for winding fibrous covering material from the spindle spool on said core, a wind-up drum for the covered thread, a drive roll for said drum, and means for simultaneously separating said belt and spindle, applying a brake to the spindle, stopping said core feeding means, and separating said wind-up drum and its drive roll.

6. A stop mechanism comprising a hollow spool-carrying spindle, a drive belt adapted to frictionally contact said spindle, means for feeding a core through said spindle including a support for a core spool and a drive roll for said core spool disposed below the spindle and a pair of separable nip rolls disposed above the spindle, traveler mechanism for winding fibrous covering material from the spindle spool on said core, a wind-up drum and associated drive roll for receiving the covered thread, and means for simultaneously separating said spindle and belt, applying a brake to the spindle, separating the core spool and its drive roll, separating the nip rolls and separating the wind-up drum and its drive roll.

7. A stop mechanism comprising a hollow spool-carrying spindle, a drive belt adapted to frictionally contact said spindle, means for feeding a core through said spindle including a pivotally mounted core spool support and a drive roll for said core spool disposed below the spindle and a pair of separable nip rolls disposed above the spindle, traveler mechanism for winding fibrous covering material from the spindle spool on said core, a wind-up drum for receiving the covered thread, a drive roll for said drum, a pivotally mounted combined belt shifter and spindle brake, a lift rod, means for operating the same, a roller carried by said lift rod and adapted to engage said wind-up drum and separate it from its drive roll, a mounting for one of said nip rolls secured to said rod, a cam secured to said rod for actuating said combined belt shifter and spindle brake, and a connection operating with said lift rod for moving the core spool and its support away from the drive roll of the core spool.

8. A stop mechanism comprising a spool carrying spindle, a drive belt adapted to frictionally contact said spindle, a pivotally mounted bell crank lever adjacent said spindle, spring means for resisting movement of said lever in one direction, solenoid operated means for moving said lever in an opposite direction, a belt shifter and a spring mounted spindle brake carried by said lever, and means for closing a circuit through said solenoid, whereby said belt may be shifted out of contact with said spindle and said brake applied.

HENRY Z. COBB.